United States Patent [19]

Auzet et al.

[11] Patent Number: 4,479,230
[45] Date of Patent: Oct. 23, 1984

[54] PROCESS AND APPARATUS FOR THE SYNCHRONIZATION ON RECEPTION OF A SIGNAL PROVIDED WITH A SYNCHRONIZATION PATTERN

[75] Inventors: Christian Auzet; Daniel Rusch; Daniel Chabernaud, all of Conflans-Sainte-Honorine, France

[73] Assignee: Lignes Telegraphiques & Telephoniques, Ste-Honorine, France

[21] Appl. No.: 344,310

[22] Filed: Feb. 1, 1982

[30] Foreign Application Priority Data

Feb. 6, 1981 [FR] France ................ 81 02412

[51] Int. Cl.³ ............................................. H04L 7/00
[52] U.S. Cl. .................................... 375/108; 328/74; 375/114
[58] Field of Search .................. 328/72, 74, 75; 370/100, 106; 371/42, 47, 48; 375/106, 108, 111, 114, 116

[56] References Cited

U.S. PATENT DOCUMENTS

| | | | |
|---|---|---|---|
| 3,652,799 | 3/1972 | Thomas | 375/111 |
| 3,920,900 | 11/1975 | Fineman | 375/111 |
| 4,271,520 | 6/1981 | Coombes et al. | 371/42 |
| 4,316,285 | 2/1982 | Bobilin et al. | 375/116 |
| 4,397,020 | 8/1983 | Howson | 375/116 |

FOREIGN PATENT DOCUMENTS 2098286  3/1972  France .
2404972  9/1977  France .

*Primary Examiner*—Benedict V. Safourek
*Attorney, Agent, or Firm*—Roland Plottel

[57] ABSTRACT

A process and apparatus for the synchronization on reception of a signal provided with a synchronization pattern. The process consists of retaining the synchronization setting until it can be readjusted on a periodically appearing potential synchronization pattern, optionally in the absence of a reference synchronization pattern corresponding to a previously acquired synchronization. The apparatus has a potential time base loaded to a given count during the presence of a potential synchronization pattern and a reference time base looped on itself and producing a synchronization signal when it reaches a given count. If a potential synchronization pattern is present in an iterative manner, a logic circuit produces a signal causing the synchronization change by loading the reference time base with the potential time base.

13 Claims, 8 Drawing Figures

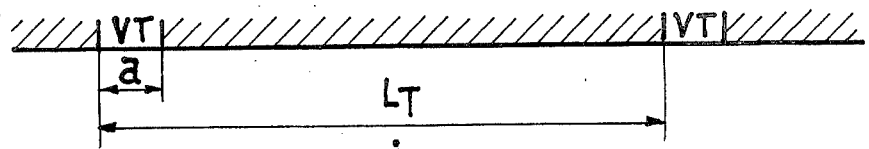
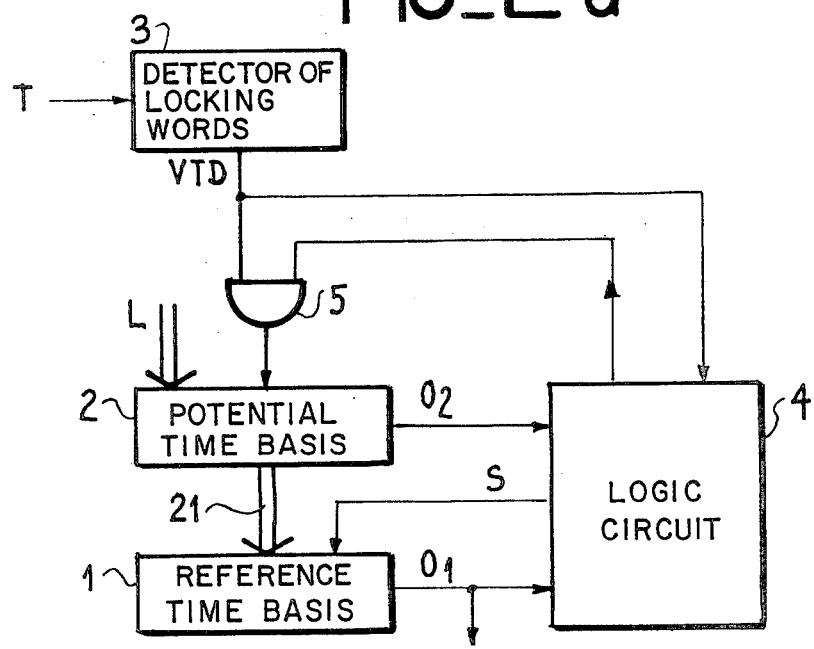
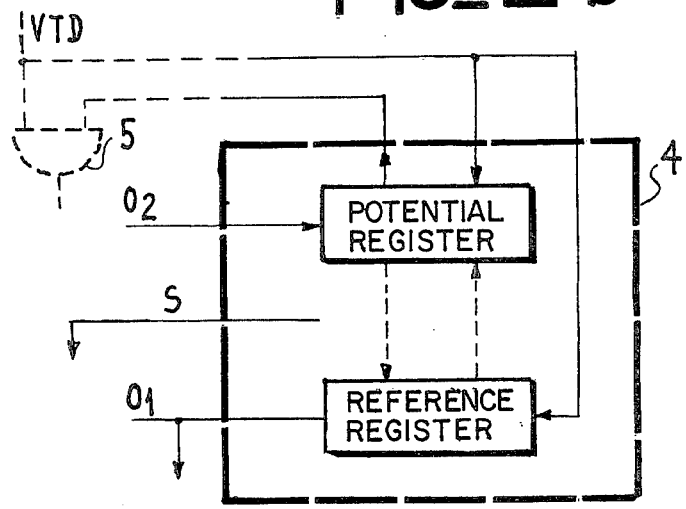

FIG_3
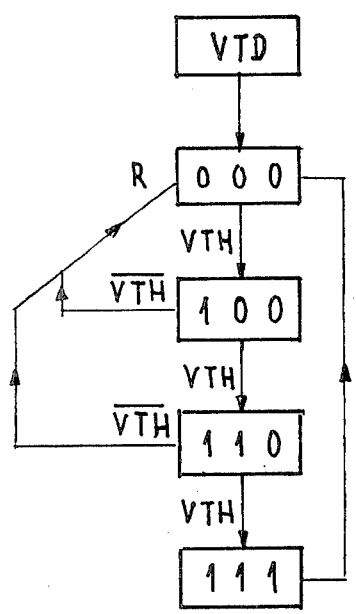
FIG_5
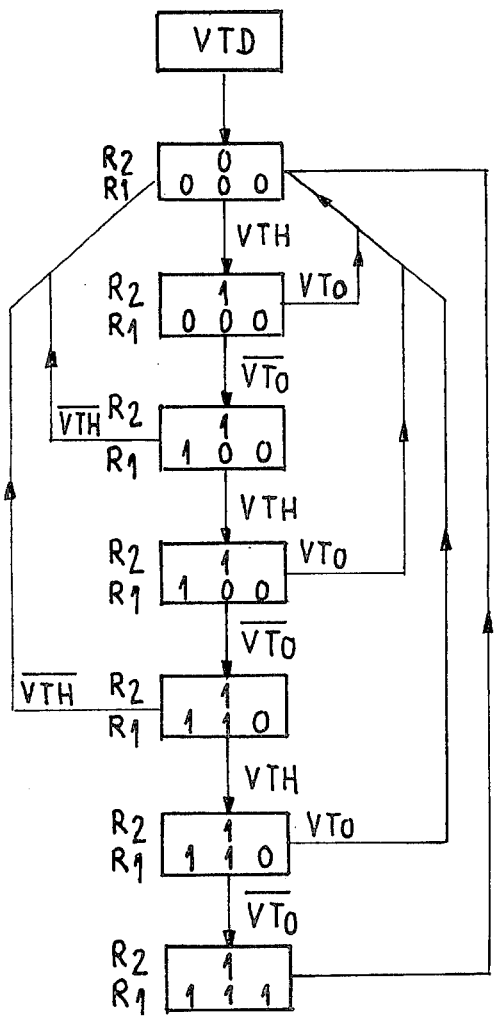

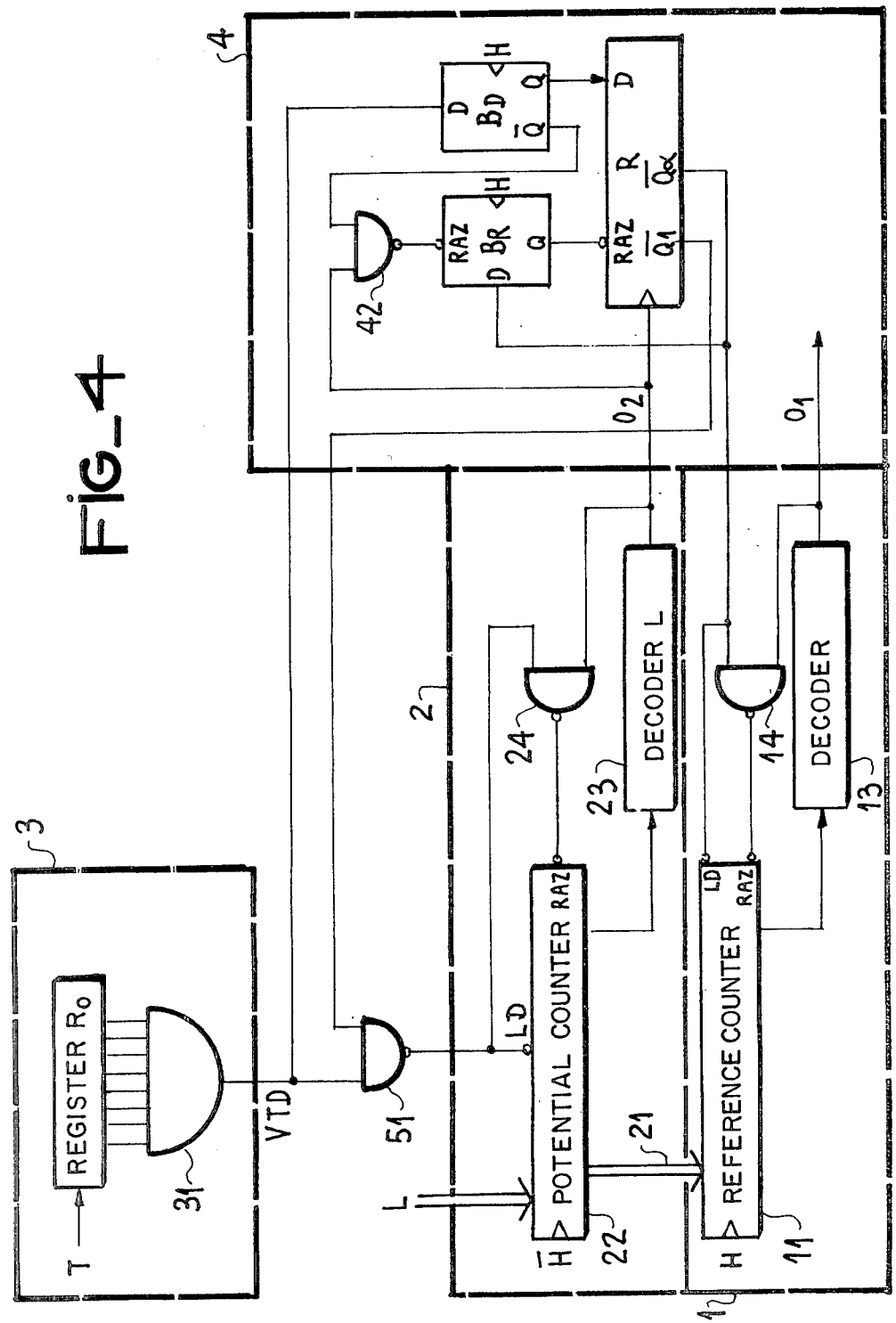
Fig_4

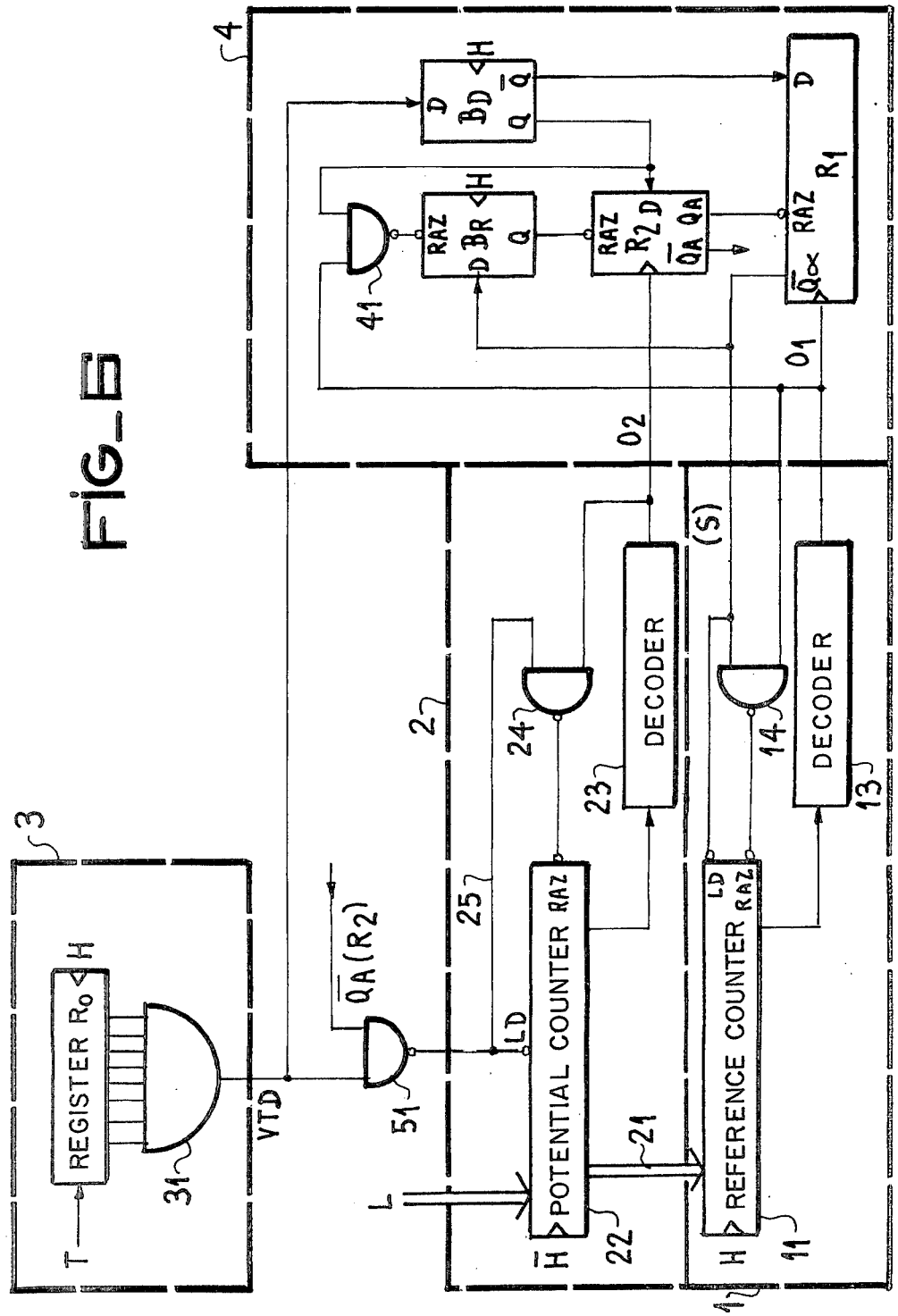

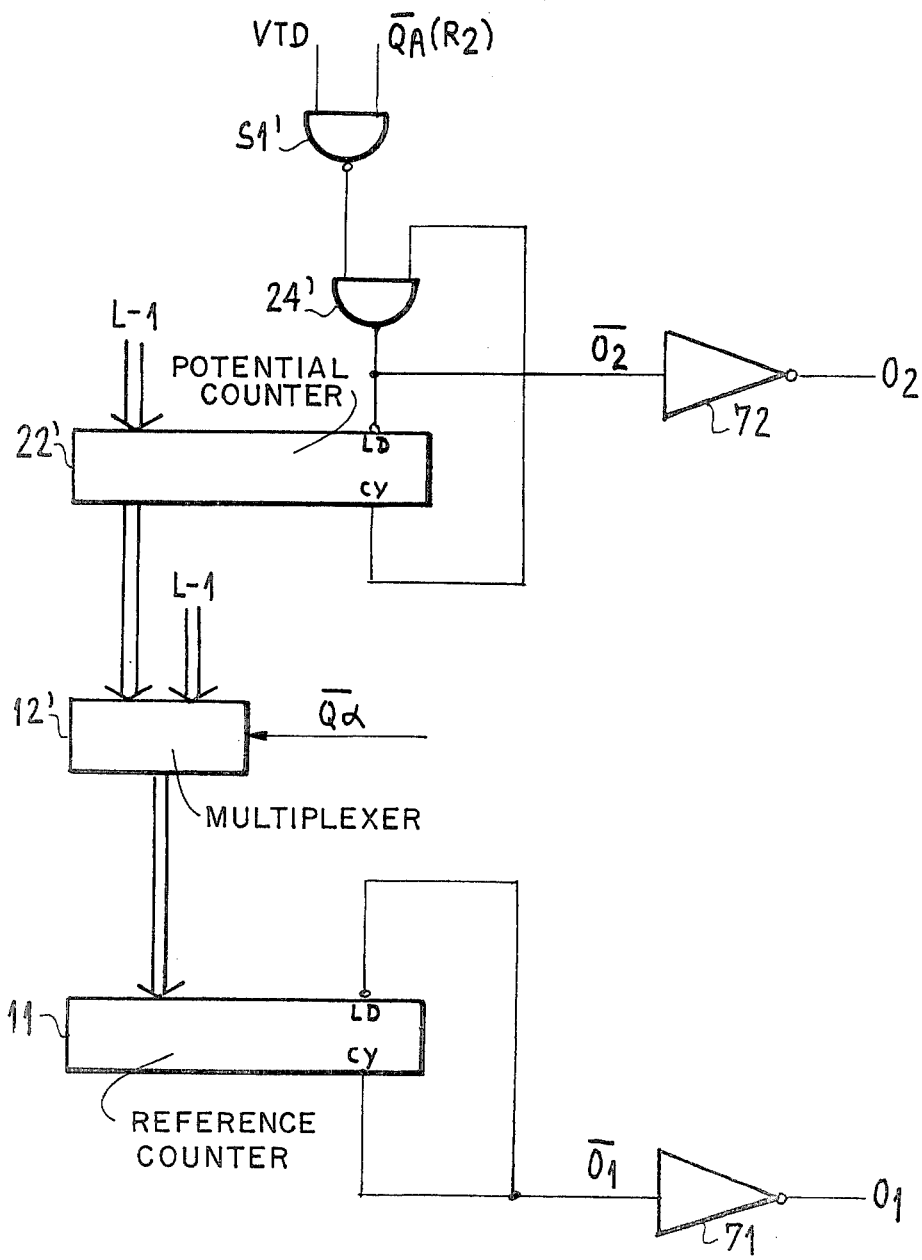

PROCESS AND APPARATUS FOR THE SYNCHRONIZATION ON RECEPTION OF A SIGNAL PROVIDED WITH A SYNCHRONIZATION PATTERN

BACKGROUND OF THE INVENTION

The present invention relates to a process and to an apparatus for the synchronization on reception of a signal provided with a synchronization pattern.

From the prior art, it is known to carry out such a synchronization by performing logic operations particularly with regards to the loss and resumption of synchronization. However, such apparatus have the disadvantage of being very sensitive to micro-interruptions or fading of the signal. The chosen criteria bring about a synchronization loss during the iterative absence of the decoding of the previously acquired stabilized synchronization signal. This is particularly the case with the criteria recommended by the C.C.I.T.T., which involves a synchronization loss and resumption cycle when a new synchronization is sought after abandoning the previous synchronization.

BRIEF SUMMARY OF THE INVENTION

The invention relates to a process and to an apparatus permitting a stable and reliable synchronization, which is not disturbed by micro-interruptions or fading of the signal, due to the fact that the synchronization loss and resumption cycle may only occur in the presence of a stable potential synchronization.

Thus, the present invention relates to a process for the synchronization on reception of a transmission signal involving the operation of decoding a periodically appearing synchronization pattern and an operation for performing a logic synchronization cycle which more particularly checks a synchronization loss and resumption criterion and produces a periodic identification of a reference synchronization pattern, an identification of potential synchronization patterns, as well as a confirmation of a potential synchronization according to a logic criterion, wherein the cycle consist of:

(a) producing a confirmation of the absence of reference synchronization according to a logic criterion, (b) in the case of confirmation of the absence of a reference synchronization and the presence of a potential synchronization, readjusting the synchronization to the potential synchronization (c) in the opposite case retaining the previous synchronization setting.

According to a first variant, this readjustment takes place without taking account of the presence or absence of the reference synchronization pattern.

According to a second variant, this readjustment only takes place if the reference synchronization pattern no longer appears.

According to a preferred embodiment, the process involves a cycle leading to a synchronization readjustment when $a_1$ successive presences of a potential synchronization pattern, corresponds to $a_2$ successive absences of a reference synchronization pattern.

The invention also relates to an apparatus for the synchronization on reception of a transmission signal provided with a synchronization pattern and incorporating a decoder of the synchronization patterns, and a logic synchronization circuit comprising at least one synchronization loss and resumption sequence. The apparatus according to the invention has a first potential time base, means for bringing it into a given state in the presence of potential synchronization patterns, a second reference time base looped on itself and producing a synchronization signal when it reaches a given state, and the logic synchronization circuit receives the decoding of a given state of the potential time base, as well as a signal representing a detection of a synchronization pattern and produces, a phasing signal of the reference time base in accordance with a logic criterion, only when the presence of a potential synchronization pattern and the absence of a reference synchronization pattern are confirmed, in such a way that the synchronization is readjusted on the potential synchronization pattern.

According to a preferred embodiment, the logic synchronization circuit comprises two registers, whereof at least one is a shift register, the so-called potential register registering a potential synchronization pattern at the other called the reference register registers the reference synchronization pattern. The reference time base phasing signal is constituted by the decoding of the nth successive incrementation of the shift register and the registers are reset during such a decoding, when a reference synchronization pattern is present.

BRIEF DESCRIPTION OF THE DRAWINGS

The invention is described in greater detail hereinafter relative to non-limitative embodiments and the attached drawings, wherein show:

FIG. 1 a frame transmission signal.

FIG. 2a and 2b functional diagrams according to the invention.

FIGS. 3 and 5 diagrams of states to which correspond the embodiments of respectively FIGS. 4 and 6.

FIG. 7 an easily programmable variant according to the invention.

DETAILED DESCRIPTION OF THE PREFERRED EMBODIMENTS

FIG. 1 illustrates a continuous transmission by frames to which the invention can be applied. A frame of $L_T$ bits has at its start a synchronization pattern VT of a bits (e.g. $L_T=768$ and $a=8$). It is apparent that in general terms the invention is applicable to any reception system where signals are periodically provided with a synchronization pattern.

FIG. 2a shows a detector 3 of locking words receiving the signal T to be synchronized. The locking words constitute the synchronization patterns. The decoding signal VTD of a synchronization motif is introduced into a potential time base 2, which is therefore brought to a given phase, optionally in the presence of an authorization signal from a logic circuit 4 for the validation of the locking operations, which also receives the decoding signal VDT. The decoding of a given state of the potential time base 2 produces a signal $O_2$ in the direction of logic circuit 4. Whilst detecting the coincidences between a VTD and the signal $O_2$, the logic circuit 4 then produces an identification of potential synchronization patterns VTH. The logic circuit 4 then produces, in accordance with a logic criterion, a signal S confirming the potential synchronization. In the same way, the decoding of a given state of a reference time base 1 looped on itself produces a synchronization signal $O_1$, which is optionally introduced into the logic circuit 4. Signal S confirming the potential synchronization, which is thus produced by logic processing of signals $O_2$ and VDT, is introduced at an input of time base 1 and has the effect of phasing the latter, whilst readjusting it into the potential synchronization pattern VTH.

According to a preferred variant, the logic circuit 4 also produces an identification of the absence of a reference synchronization pattern and to this end receives signal $O_1$. The production of signal S controlling the readjustment of the synchronization to the confirmed potential synchronization pattern VTH will then only take place if the reference synchronization pattern no longer appears.

FIG. 2b describes a structure of logic circuit 4 where a reference register and a potential register receive the signal VTD and respectively the signals $O_1$ and $O_2$. The production of a signal S will be involved on comparing the contents of the registers, which may interact.

In the case where the readjustment of the synchronization takes place without taking account of the presence or absence of the reference synchronization pattern, according to the embodiment of FIG. 4 a shift register R is used, which registers each periodic appearance of a potential synchronization pattern.

A state diagram of the register is shown in FIG. 3 in the particular case where the degree $\alpha$ of checking of the criterion is equal to 3. Any noted absence $\overline{VTH}$ of a reconfirmation of a new potential synchronization resets the cycle to 0. Any noted reconfirmation VTH of a potential synchronization introduces a logic 1 into shift register R. At the end of three successive reconfirmations, the decoding of a logic 1 in the third position in register R produces a readjustment of the synchronization on the potential pattern and a resetting of the cycle.

In FIG. 4, a register Ro receives the series data T with the timing of a line clock H. All synchronization patterns VT are detected by a multiple gate 31, which produces a signal VTD of level 1 during the recognition of such a pattern. This signal is introduced at one of the inputs of a NAND gate 51, whereof the second input receives a signal $\overline{Q_1}(R)$ under the conditions to be defined hereinafter and whereof the output is connected to the loading input LD of a synchronous potential counter 22. In the case of validation of gate 51, ($\overline{Q_1}=1$), a logic 0 appears at the output of gate 51 and validates the loading in state L of the synchronous potential counter 22 timed by clock H (input LD which authorizes the loading of the counter when it is at level 0). A decoder 23 decodes this state L and consequently produces a signal $O_2$ for timing a shift register R.

A type D flip-flop $B_D$ timed by clock H receives the signal VTD at its input D and by its output Q brings about the re-entry of the corresponding logic 1 at the input D of register R, whose first position assumes the value 1.

A synchronous reference counter 11 timed by clock H has its state L decoded by a decoder 13. This decoding leads to the production of a synchronization signal $O_1$ and said counter is thus looped on itself.

A type D flip-flop $B_R$ receives at its input D signal $\overline{Q_\alpha}$, corresponding to the $\alpha$-th position of register R and its output Q is connected to the resetting input RAZ of register R, which brings about its resetting when it is at level 0. Moreover, the input RAZ of flip-flop $B_R$ receives the output of a NAND gate 42, whose inputs are $O_2$ and the output $\overline{Q}$ of the flip-flop $B_D$. Flip-flop $B_R$ and therefore register R are consequently reset in the absence of a potential synchronization pattern ($O_2=1$, $\overline{Q}=1$).

The decoding of the position $\overline{Q_\alpha}=0$ of register R introduces a logic 0 into input LD of reference counter 11 and brings about the loading of the latter at the count of potential counter 22. A NAND gate 14, which receives $O_1$ and $\overline{Q_\alpha}$ at its inputs, prevents the resetting of reference counter 11 during its loading. In the case of synchronized operation, the reference counter remains looped on itself and is reset during the decoding of state L ($O_1=1$, $\overline{Q_\alpha}=1$).

In the same way, the resetting of potential counter 22 takes place during the decoding of state L, except in the presence of a VTD which is not blocked by gate 51. To carry this out, the output of gate 51 is connected to an input of a NAND gate 24, whose other input receives signal $O_2$ and whose output is connected to the resetting input RAZ of potential counter 22. If the detection of a synchronization pattern when gate 51 is valided coincides with a resetting of potential counter 22, gate 24 gives priority to the loading pulse LD: logic state 1 of $O_2$, which corresponds to a resetting of the potential counter, is only active if input LD is at 1, (no loading).

We will now consider the operation of the aforementioned circuit in different cases which occur in practice. Initially, the two counters are looped on themselves. Signal $O_1$ has a random phase relatively to the synchronization state. The first signal VTD for loading into the potential counter at count L and whereby a 1 is stored in register R($\overline{Q_1}=0$) is the first potential signal VTH, output Q of flip-flop $B_D$ being at state 1 because its input D receives signal VDT. $\overline{Q_1}$ which will then inhibit the NAND gate 51 and potential counter 22 will then be looped on itself. If a second VTH appears the next time, potential counter reaches counter L, a logic 1 will again be introduced into register R and the first 1 will be displaced by one notch. If a $\alpha$-th consecutive VTH appears, $\overline{Q_\alpha}$ is loaded to state 1 and the D coding of $\overline{Q_\alpha}=0$ authorizes the loading of reference counter 11 with the count of potential counter 22 via connection 21. As $\overline{Q_\alpha}=0$, input D of $B_R$ is again at level 0, and thus its output Q resets register R. Thus, the function of flip-flop $B_R$ is to delay the resetting signal of register R. The apparatus then reaches the permanent state where the two counters 11 and 22 turn in phase.

In the noted absence $\overline{VTH}$ of a VTH, register R is reset by the following mechanism: output $\overline{Q}$ of $B_D$ and $O_2$ are at level 1, so that the output of the NAND gate 42 is set 0, which in cascade resets to 0 $B_R$ and R. The output $\overline{Q_1}$ of R is then at level 1 and validates the NAND gate 51, which makes it possible to load potential counter 22 at count L during the decoding of a new synchronization pattern by the multiple gate 31.

As a variant, $\alpha$ successive outputs are decoded, e.g. the $\alpha$ first outputs of register R by means of a multiple AND gate, whose output produces the loading signal of the reference counter. In this case, the resetting of register R performed by gate 42 is no longer necessary, because the introduction of a zero in the first position of R is the logic equivalent of a resetting of the latter, i.e. and initialization of the criterion verification cycle.

According to an embodiment, two parallel-operated registers are used. For example, the potential register counts the successive potential synchronization patterns and is reset either periodically or, as a variant, during the absence of a potential pattern and the reference register counts the absences of reference synchronization patterns and is reset either periodically or, as a variant, in the presence of such a pattern. Signal S with then be produced when the two registers have reached counts $\alpha_1$ and $\alpha_2$ with optionally $\alpha_1=\alpha_2$. For example, the two registers are shift registers and the simultaneous decoding of the $\alpha_1$th and $\alpha_2$th position of the respective registers authorizes the production of signal S. If resetting takes place periodically, it will occur every $\alpha_{12}$th frames, in which $\alpha_{12}$ is the highest of the numbers $\alpha_1$ and $\alpha_2$.

According to a preferred embodiment of the invention, two registers operated in alternating manner are used, i.e. the synchronization change decision is taken in accordance with a logic criterion taking account of the alternations of the logic signals loading the registers. Such a variant is illustrated by FIGS. 5 to 7.

A state diagram of the registers is shown in FIG. 5 in the case where $\alpha=3$ and corresponds to the operation of the circuit described in exemplified manner in FIG. 6. Any presence of a reconfirmation VTO of the previous synchronization or any absence $\overline{VTH}$ of a reconfirmation of a new potential synchronization resets the cycle to zero. Three successive alternations of the presence of a potential synchronization pattern VTH and the absence $\overline{VTO}$ of a reference synchronization pattern, bring about the change of synchronization and the resetting of registers $R_1$ and $R_2$.

In FIG. 6, shift register $R_0$ receives series data T from the frame with the timing of the line clock H. The synchronization pattern VT is investigated by a multiple AND gate 31, which produces a level 1 VTD signal during the recognition of such a pattern. This signal is introduced directly at the loading input LD of a potential counter 22 or, according to a preferred variant, at one of the two inputs of an AND gate 51, whereof the second input receives a signal $\overline{Q_A}(R_2)$ under conditions to be defined hereinafter. In the case of authorization ($\overline{Q_A}=1$) a logic 0 appears at the output of gate 51 and validates the loading of potential counter 22 to value L. The potential counter is timed by clock H. A decoder 23 decodes this state L and consequently produces a timing signal $O_2$ of a register $R_2$ in the case of a single flip-flop. A flip-flop $B_D$ timed by clock H also receives signal VTD at its input D and consequently brings about the re-entry of the logic 1 present at its output Q at input D of register $R_2$, which thus assumes the value R. The inverse output $\overline{Q_A}$ of register $R_2$, which is in this case at level 0, constitutes the signal introduced at the second input of the aforementioned AND gate 51. Whilst register $R_2$ is loaded ($\overline{Q_A}=0$), the AND gate 51 is inhibited and the potential counter remains looped on itself, making it possible to ignore in the potential counter possible subsequent synchronization patterns. Output $Q_A$ of $R_2$ is connected to the resetting input RAZ of register $R_1$. A reference counter 11 timed by clock H and looped on itself sees its state L decoded by a decoder 13. This decoding leads to the production of a synchronization signal $O_1$, which is introduced as a timing signal into a shift register $R_1$. This shift register $R_1$ receives the output $\overline{Q}$ of flip-flop $B_D$ at its input D.

Synchronization signal $O_1$ is introduced at an input of a NAND gate 41, whose other input receives signal Q from flip-flop $B_D$. The output of the NAND gate 41 is introduced at the resetting input RAZ of a flip-flop $B_R$ timed by clock H and which receives at its input D an inverse signal $\overline{Q_\alpha}$, whose value is equal to 1, except in the case of a synchronization change in the manner to be explained hereinafter. The output of flip-flop $B_R$ is introduced at the resetting input RAZ of register $R_2$. Output $Q_A$ of register $R_2$ is introduced at the resetting input RAZ of register $R_1$.

Consideration will now be given to the operation of the aforementioned circuit in the different cases occurring in practice.

Initially, the two counters are looped on themselves. Signal $O_1$ has a random phase compared with the synchronization state. The first signal VDT which will load the potential counter at count L and store a 1 in register $R_2$ is the first potential signal VTH, the output Q of flip-flop $B_D$ being in fact at state 1 because its input D receives the signal VTD. $\overline{Q_A}$ inhibits AND gate 51. If no signal VTD appears at the moment when the reference counter reaches count L, flip-flop $B_D(\overline{Q}=1)$ introduces a logic 1 into input D of register $R_1$. If a second VTH appears on the following occasion when the potential counter reaches count L, register $R_2$ remains at value 1. When the reference counter again reaches count L, a 1 will again be introduced into shift register $R_1$ and the first 1 will be displaced by one notch. This continues until $Q_\alpha$ is loaded at value 1 ($\overline{Q_\alpha}=0$) after $\alpha$ displacements. The presence of $\overline{Q_\alpha}=0$ leads to the loading of the reference counter with the count of the potential counter (input LD=0). Thus, in this case, the input of the NAND gate 14 which receives $\overline{Q_\alpha}$ is at zero and its output at 1, which inhibits a possible resetting of the reference counter. Synchronization is now obtained. Simultaneously, $\overline{Q_\alpha}=0$ brings $B_R$ to level 0, which in cascade leads to the resetting of registers $R_1$ and $R_2$ and also on locks AND gate 51 ($\overline{Q_A}=1$).

If a decoding of a synchronization pattern now appears whenever the reference counter has reached count L, $R_1$ and $R_2$ will be reset in cascade via NAND gate 41. If no decoding is involved at some other time, flip-flop $R_2$ will remain at zero.

The reference counter is then looped on itself and reset by the detection of the decoding of its state L ($O_1=1$), producing, because $\overline{Q_\alpha}=1$, a logic 0 at the output of the NAND gate 14, whose output is connected to the resetting input RAZ of reference counter 11.

As in the case of FIG. 4, the function of the NAND gate 24 is to give priority to the loading rather than to the resetting of the potential counter. At its respective inputs, this gate receives the output of NAND gate 51 and the output of decoder 23 (signal $O_2$), whilst its output is connected to the RAZ input of potential counter 22.

The loop functions in the following manner during the appearance of the decoding of a potential synchronization pattern outside state L of the reference counter. Such a decoding brings about the loading of a logic 1 into register $R_2$ and consequently to the inhibition of NAND gate 51, preventing any taking into account of a subsequent detection by the potential counter looped on itself in this way. If a detection of the synchronization pattern coincides with the decoding of state L of the reference counter (signal $O_1$), $R_2$ and $R_1$ are reset. In the opposite case, register $R_1$ is loaded by a logic 1 and register $R_2$ remains at level 1. Synchronization change will then take place when $\alpha$ repeat synchronization patterns appearing in coincidence with $O_2$ alternate with $\alpha$ detections of the absence of a synchronization pattern during the appearance of signal $O_1$.

Any presence of a reconfirmation VTO of the prior synchronization leads to the resetting of $R_1$ and $R_2$ by a cascade validation of their input RAZ. As flip-flop $B_D$ has stored VTD=1, gate 41 simultaneously receives a logic 1 at each of its inputs. Any absence of a reconfirmation of a new potential synchronization leads to the introduction of a zero into register $R_2$ and to the resetting of register $R_1$. Flip-flop $B_D$ has in fact stored VTD=0.

As in the case of FIG. 4, the decoding of $\alpha$ successive outputs of the shift register can be substituted for that of the signal $\alpha$ th position and in this case the introduction of a logic 0 in the first position of the shift register is, from the logic standpoint, equivalent to a resetting, i.e. to an initialization of the criterion checking cycle.

Moreover, it should be pointed out that flip-flop $B_D$ has the function of delaying signals VTD by a time equivalent to the transmission time of signal $O_2$. In the present case, this time lag is one clock cycle ($\frac{1}{2}$ cycle at the potential counter timed by clock $\overline{H}$, $\frac{1}{2}$ cycle at the decoding of the potential counter state, e.g. by decoder 23).

It is obvious that the synchronization change by rephasing the potential time base can be obtained by means other than those described hereinbefore, e.g. by loading a reference counter to a given count. It will be clear that the above description has envisaged a non-limitative case where the two counters were of the same type and operated symmetrically.

The performance of an apparatus according to the invention and corresponding to the criterion whose diagram is given in FIG. 5 are illustrated in the following tables in which the times are expressed in a number of frames and with the following notations:

tms = mean synchronization time
tmd = mean desynchronization time
$P = 1/2^a$ = of a VT word
td 99% = desynchronization time corresponding to a 0.99 probability of remaining synchronized
tdm = minimum desynchronization time
ts 99% = synchronization time corresponding to a 0.9 probability of being synchronized
$\sigma$ = standard deviation.

The numerical applications (calculation and measurements) are given for $\alpha=3$, L=768 and a=8 and the corresponding results are given in the form of a number of frames.

TABLE I

| SYNCHRONIZATION (for a zero in line error rate) | |
|---|---|
| C.C.I.T.T. CRITERION | CRITERION ACCORDING TO THE INVENTION |
| tms = $\alpha$ + LP = 6 | tms = $\alpha$ + 1 + LP = 7 |
| $\sigma$ ms = $\sqrt{LP}$ = 1.73 | ms = $\sqrt{LP} + \sqrt{\frac{\alpha}{L}}$ = 1.83 |
| ts 99% = tms + 3$\sigma$ ms = 11.2 | ts 99% = tms + 3$\sigma$ ms = 12.5 Measured: tms = 6.93; $\sigma$ ms = 1.75; ts 99% = 10 |

TABLE II

| DESYNCHRONIZATION (for a 0.5 line error rate) | |
|---|---|
| C.C.I.T.T. CRITERION | CRITERION ACCORDING TO THE INVENTION |
| tmd = 1 + $\alpha$ = 4 | tmd = $\frac{1 + LP}{LP^\alpha}$ = 87.300 |
| $\sigma$ md = $\sqrt{LP}$ = 1.7 | $\sigma$ md = tmd = 87 300 |
| tdm = td 99% = $\alpha$ = 3 | tmd = td; with a probability of |

TABLE II-continued

| DESYNCHRONIZATION (for a 0.5 line error rate) | |
|---|---|
| C.C.I.T.T. CRITERION | CRITERION ACCORDING TO THE INVENTION |
| | 6 $10^{-8}$ = 3 Measured: tmd = 94 900; $\sigma$ md = 73 400; td 99% = 2 600 |

Comparison easily shows that the synchronization is hardly affected by the criterion according to the invention, whereas desynchronization has little chance of intervening in a fortuitous manner.

The circuit of FIG. 6 can easily be adapted to the case when it is desired to obtain $\alpha_1 \neq \alpha_2$. For this purpose, it is merely necessary to replace register $R_2$ by a shift register, whereby $R_1$ may only be a flip-flop. The decoding of $\overline{Q}_\alpha(R_2)$ is introduced under the same conditions to an input of gate 14. The synchronization change then takes place at the end of the $\alpha$th presence for a potential synchronization pattern and the ($\alpha-1$)th absence of a reference synchronization pattern. This variant makes it possible to obtain intermediate criterion verification degrees.

The circuit of FIG. 7 is a variant of that of FIGS. 4 and 6, where a synchronous potential counter 22' and a synchronous reference counter 11' are loaded as a result of a decoding of a given state. For example, the counters shown in FIG. 7 operate by counting down and their maximum count state n (CY=0) is decoded. The introduction of this decoding signal at their loading input LD brings about the loading thereof.

With respect to potential counter 22', signal CY is introduced at the input of an AND gate 24', whose other input receives the output of a NAND gate 51'. The NAND gate 51' receives at one input the signal VTD and at its other input signal $\overline{Q}_A(R_2)$ (case of FIG. 6) or $\overline{Q}_1(R)$ (case of FIG. 4). AND gate 24' enables the loading in state L—1 of potential counter 22' either in the presence of signal CY=0 or in the presence of a VTD=1, which passes through gate 51', ($\overline{Q}_A(R_2)$ or $\overline{Q}(R)=1$) or when they are simultaneously present. The output of a gate 24' constitutes the inverse $\overline{O}_2$ of signal $O_2$ of FIGS. 3 and 6. Signal $O_2$ can then be obtained by means of an inverter 72.

Signal CY of reference counter 11' is directly introduced at its loading input LD and constitutes the inverse $\overline{O}_1$ of signal $O_1$ of FIGS. 3 and 6. Signal $O_1$ can then be obtained by means of an inverter 71. A signal $\overline{Q}_\alpha$ of a shift register (R, $R_1$ or $R_2$) introduced at the selection input ES of a multiplexer MUX brings about the loading of the reference counter either at count L—1 if $\overline{Q}_\alpha=1$ or by the state of the outputs of the potential counter if $\overline{Q}_\alpha=0$, which corresponds to a synchronization change.

The diagram described in FIG. 7 can easily be realised in the form of a programmable circuit because the looping of the counters on themselves brings about a state independent of the frame length L. Therefore, for a particular application, it is merely necessary to programme, e.g. using code wheels, the inputs of the two counters in such a way that they are loaded to a state corresponding to the length L of the frame in the case where L—1. The criterion verification degree $\alpha$ is selected by using the output of rank $\alpha$ of shift register $R_1$ or $R_2$, whereby in this case a standard circuit can have two shift registers. The number of inputs of AND gate 31 fixes the number of bits of the synchronization pattern. A programmable circuit according to the invention can be integrated on a monolith having the outputs necessary for the programming of framed length L and the criterion verification degree $\alpha$ (integral or intermediate).

What is claimed is:

1. A process for the synchronization on reception of a transmission signal involving the operation of decoding a periodically appearing synchronization pattern and an operation involving a logic synchronization cycle particularly checking a synchronization loss and resumption criterion and producing a periodic detection of a reference synchronization pattern, a permanent detection of potential synchronization patterns, as well as a periodic confirmation of a potential sunchronization in accordance with a logic criterion, wherein the cycle consists of:
   (a) detecting the absence of reference synchronization and producing a confirmation of said absence according to a logic criterion,
   (b) in the case of confirmation of said absence of a reference synchronization and of confirmation of the presence of a potential synchronization, readjusting the synchronization to said confirmed potential synchronization,
   (c) in the other cases retaining the previous synchronization setting.

2. A process according to claim 1, wherein the logic synchronization cycle comprises a step of initializing the cycle by the presence of a reference synchronization pattern and the absence of a potential synchronization pattern.

3. A process according to claims 1 or 2, wherein said cycle is such that it operates a synchronization readjustment step when $\alpha_1$ successive presences of a potential synchronization pattern alternate with $\alpha_2$ successive absences of the reference synchronization pattern.

4. An apparatus for the synchronization on reception of a transmission signal provided with periodic synchronization patterns and incorporating a decoder receiving said transmission signal and producing synchronization patterns at its output, and a logic synchronization circuit receiving said output of said decoder and performing therewith at least one synchronization loss and resumption sequence, at least a potential time base, receiving the output of said decoder for the detection of a potential synchronization pattern, said detection being achieved by means for bringing said potential time base into a first given state every time a synchronization pattern appears in the received signal, said potential time base producing a potential signal when into said first given state, a reference time base looped on itself and producing a synchronization signal when it reaches a second given state, the logic synchronization circuit receiving said potential signal of said potential time base, sand producing according to a logic criterion, a phasing signal of the reference time base in such a way that the synchronization is readjusted to the potential synchronization pattern, wherein the logic synchronization circuit also receives said synchronization signal and consequently produces the said phasing signal in accordance with a logic criterion only when the presence of a potential synchronization pattern is confirmed and the absence of a reference synchronization pattern is confirmed.

5. An apparatus according to claim 4, wherein the logic synchronization circuit comprises a shift register timed by said potential signal and loaded by a synchroniation pattern detection signal and wherein the signal is constituted by the decoding of at least the $\alpha$th output of the shift register and wherein the shift register is reset during such a decoding.

6. An apparatus according to claim 4, wherein the logic synchronization circuit comprises two registers, each receiving said output of said decoder one being a potential register receiving and registering said potential signal and the other register being a reference register receiving and registering said reference signal, at least one of the two registers being a shift register, wherein said phasing signal is constituted by the decoding of the $\alpha$th successive incrementation of the shift register and wherein the registers are reset during such a decoding when a reference synchronization pattern is present and when a potential synchronization pattern is absent.

7. An apparatus according to claim 4, wherein it comprises a first and a second counters looped on themselves and constituting respectively the potential and reference time bases and wherein the looping on themselves of the two counters if brought about by resetting respectively said first or second counter when it reaches respectively said first or second given state.

8. An apparatus according to claim 7, wherein the resetting of the potential counter is inhibited by the appearance of a synchronization pattern, which brings about the loading of the potential counter to a given count.

9. An apparatus according to claims 7 or 8, wherein the resetting of the reference counter is inhibited by the decoding of the $\alpha$th successive incrementation of a shift register constituting the potential register or the reference register and which brings about the loading of the reference counter.

10. An apparatus according to claim 4, wherein it comprises a potential and a reference counter looped on themselves and constituting the potential and reference time bases and wherein the looping on themselves of the two counters is brought about by loading each counter to a third given state during the decoding of a fourth given state of respective counter.

11. An apparatus according to claim 10, wherein the reference counter is loaded by the output of a multiplexing circuit either by the state of the outputs of the potential counter or to a fifth given state, as a function of whether or not said signal does or does not correspond to a synchronization change.

12. An apparatus according to claims 10 or 11, wherein it is realised in the form of a monolithic circuit in which the value of the given state of the counters is programmable as a function of the frame length and in which the th output of at least on shift register is accessible so as to be able to select the criterion verification degree $\alpha$.

13. An apparatus according to claim 5, wherein a synchronization pattern decoding signal delivered at the output of said decoder is transmitted to the potential counter only if the potential register is at logic level 0 corresponding to a previous absence of a potential synchronization pattern.

* * * * *